United States Patent [19]
Kim et al.

[11] Patent Number: 6,072,755
[45] Date of Patent: Jun. 6, 2000

[54] OPTICAL DISK PLAYER HAVING MULTIDOMAIN MEMORY FOR STORING DEMODULATED, ERROR-CORRECTED AND DESCRAMBLED DATA

[75] Inventors: Byung-Jun Kim, Suwon; Jae-Seong Shim, Seoul; Chan-Dong Cho, Ahnsan, all of Rep. of Korea

[73] Assignee: Samsung Electronics Co., Ltd., Suwon, Rep. of Korea

[21] Appl. No.: 08/882,231

[22] Filed: Jun. 25, 1997

[30] Foreign Application Priority Data

Jun. 25, 1996 [KR] Rep. of Korea ................ 96-23618

[51] Int. Cl.[7] .................................................. G11B 17/22
[52] U.S. Cl. .............................................. 369/32; 386/126
[58] Field of Search ................................. 369/32, 59, 58, 369/33, 47, 48; 386/126, 125

[56] References Cited

U.S. PATENT DOCUMENTS

| | | | |
|---|---|---|---|
| 4,603,413 | 7/1986 | Sinjou et al. | 369/59 |
| 5,734,787 | 3/1998 | Yonemitsu et al. | 386/111 |
| 5,734,788 | 3/1998 | Nonomura et al. | 386/126 |
| 5,771,331 | 6/1998 | Aoki et al. | 386/68 |
| 5,917,792 | 6/1999 | Shigenobu et al. | 369/59 |

*Primary Examiner*—Tan Dinh
*Attorney, Agent, or Firm*—Staas & Halsey

[57] ABSTRACT

A device for controlling a multidomain memory of an optical disk player which performs demodulation, error correction and descrambling for information data reproduced from an optical disk, and transmits data descrambled to an audio/video decoder or ROM decoder. The device for controlling the multidomain memory includes a memory for reading or writing data modulated, error-corrected or descrambled by the disk player, the memory including a plurality of units each of which has a characteristic number; a demodulation address generator for counting a clock which latches the demodulated data; an error correction address generator for generating an address signal for reading data to be error-corrected from the memory; a descramble address generator for generating an address signal for storing the descrambled data into the memory; a record/reproduction controller for generating signals required for accessing the memory in order to record or reproduce data; a data output address generator for generating an address signal for reading data to be transmitted from the memory when a data transmission request signal is received from the audio/video decoder or the ROM decoder; and a memory state controller for judging whether a memory state is in overflow, underflow or empty by comparing the addresses generated from the address generators with a predetermined critical value, so as to command the record/reproduction controller not to record any more, or to generate a signal indicating the memory state.

16 Claims, 6 Drawing Sheets

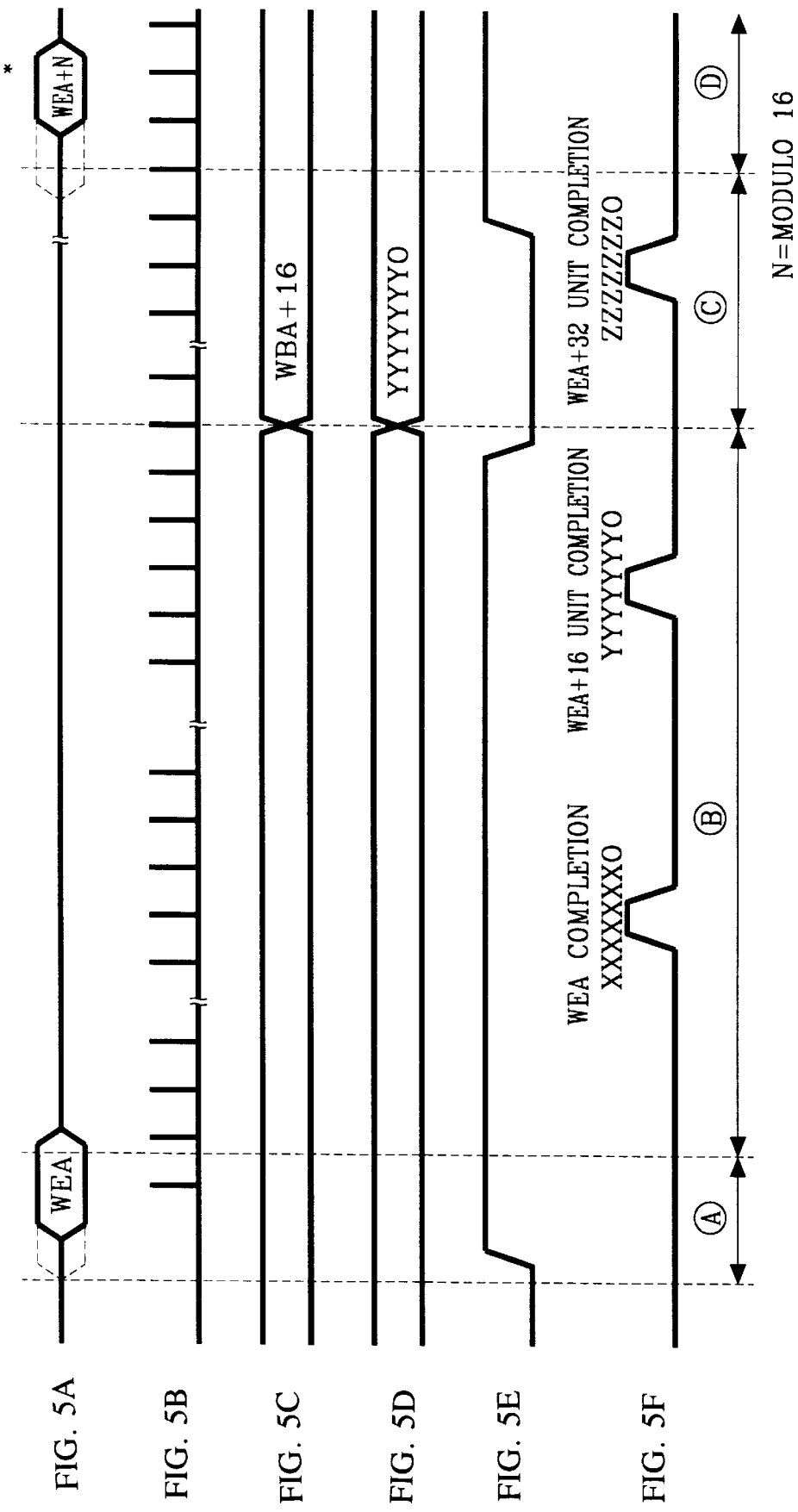

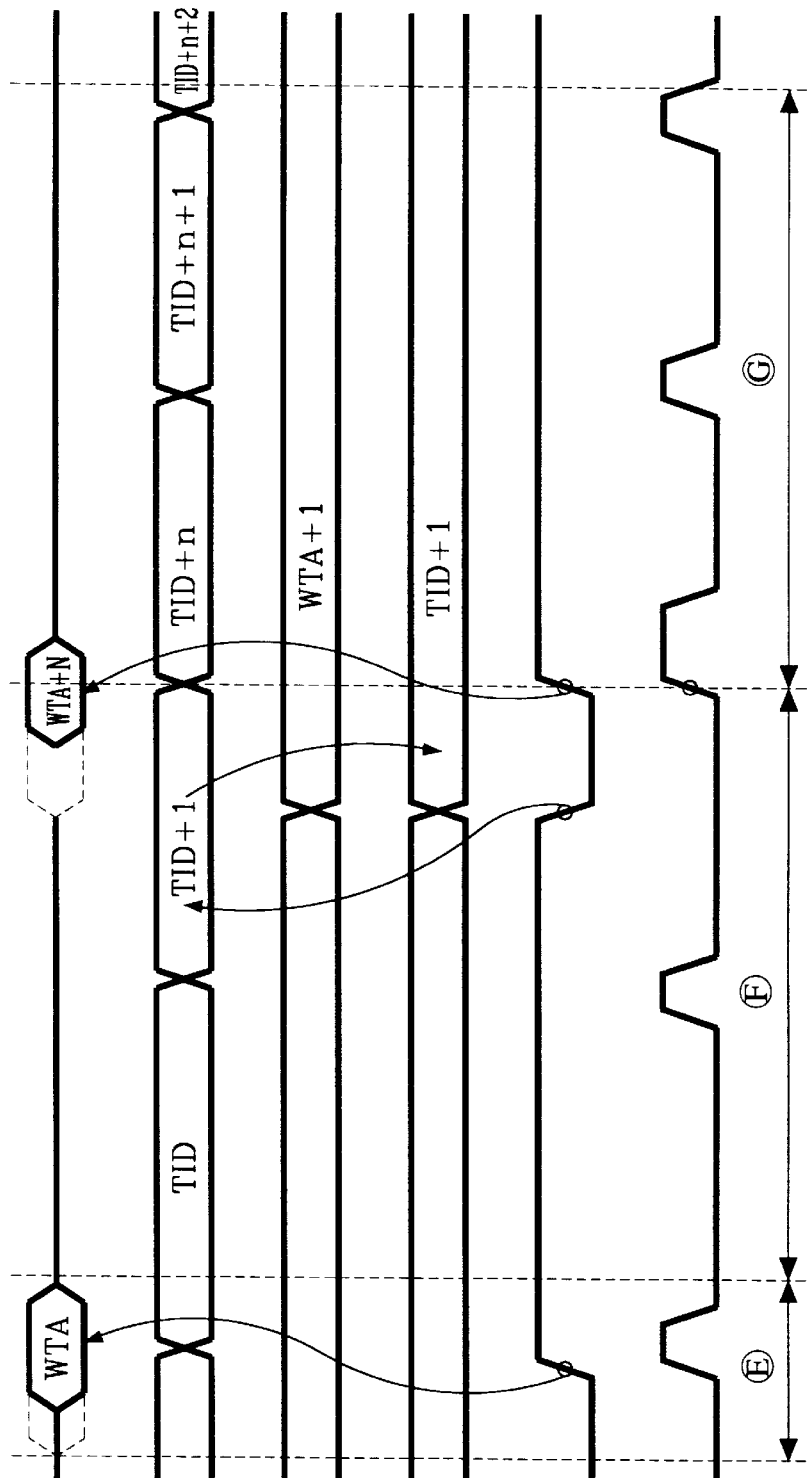

OPTICAL DISK PLAYER HAVING MULTIDOMAIN MEMORY FOR STORING DEMODULATED, ERROR-CORRECTED AND DESCRAMBLED DATA

BACKGROUND OF THE INVENTION

1. Field of the Invention

The present relates to a device and method for controlling a memory and, more particularly, to a device and a method for dividing a memory of a digital video disk player into multiple domains, and controlling these domains.

2. Description of the Related Art

A digital video disk, one type of digital moving picture disk media, is a next-generation high-quality multimedia memory device which stores over two hour's worth of digital video of MPEG (Moving Picture Experts Group) 2. A conventional digital video disk player separately has an error correction memory and a data buffering memory. Static RAM and dynamic RAM are used as the former and the latter, respectively. When the two different memories are used, regions for controlling the recording and reproduction processes are required for each of them. Accordingly, the configuration of the disk player becomes complicated and its product cost is increased. Furthermore, as a result, it is difficult to produce a small-size disk player.

SUMMARY OF THE INVENTION

An objective of the present invention is to provide a device and a method of controlling a multidomain memory, in which one memory is divided into multiple domains when a digital video disk is played back.

To accomplish the above and other objectives of the present invention, there is provided a device for controlling a multidomain memory of an optical disk player which performs demodulation, error correction and descrambling for information data reproduced from an optical disk, and transmits descrambled data to an audio/video decoder or ROM decoder, the device including a memory for reading or writing data demodulated, error-corrected or descrambled by the disk player, the memory including a plurality of units each of which has a characteristic number; a demodulation address generator for counting a clock which latches the demodulated data; an error correction address generator for generating an address signal for reading data to be error-corrected from the memory; a descramble address generator for generating an address signal for storing the descrambled data into the memory; a record/reproduction controller for generating signals required for accessing the memory to record or reproduce data; a data output address generator for generating an address signal for reading data to be transmitted from the memory when a data transmission request signal is received from the audio/video decoder or ROM decoder; and a memory state controller for judging whether a memory state is in overflow, underflow or empty by comparing the addresses generated from the address generators with a predetermined critical value, so as to command the record/reproduction controller not to record any more, or to generate a signal indicating the memory state.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 5A through 5F are timing diagrams of signals for correcting errors according to the embodiment of the present invention; and FIGS. 6A through 6F are timing diagrams of signals for transmitting data according to the embodiment of the present invention.

DETAILED DESCRIPTION OF THE PREFERRED EMBODIMENT(S)

Reference will now be made in detail to the preferred embodiment of the present invention, examples of which are illustrated in the accompanying drawings. For clarity, component reference numbers are consistent between all the drawings such that identical components in the present invention have the same reference numbers. There appear many particular details like an element of a specific circuit in the following description. These details are provided just for general understanding of the present invention. It is obvious for a person having common knowledge on this technology that the present invention can be embodied without the particular details. In describing the present invention, a detailed description has been omitted where such a description would make the present invention ambiguous.

Figure 1:
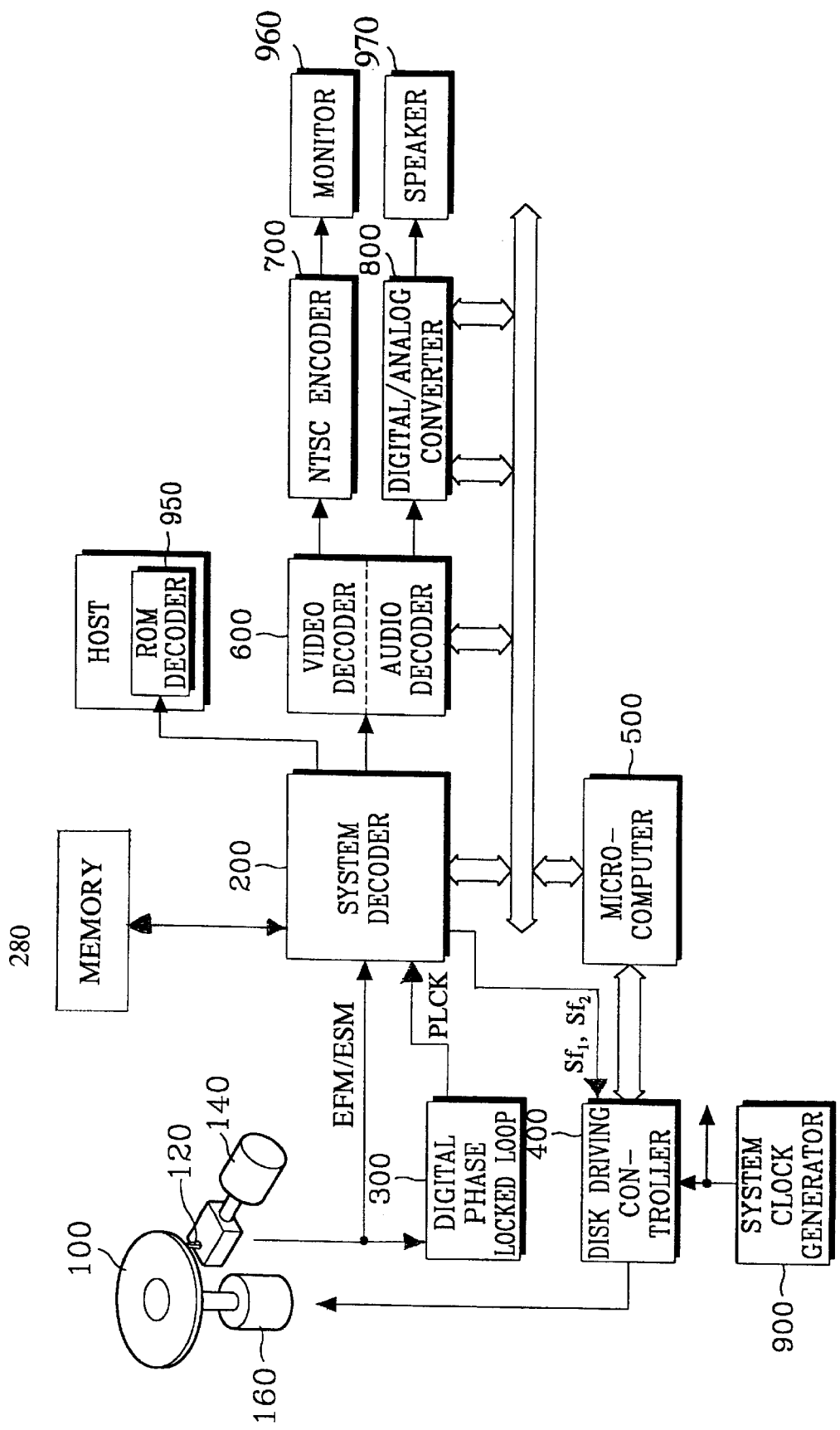
FIG. 1 is a block diagram showing a configuration of a digital video disk player according to an embodiment of the present invention.

FIG. 1 is a block diagram showing a configuration of a digital video disk player according to the present invention. Referring to FIG. 1, when a disk 100 is played back, a disk motor 160 is rotated at a predetermined speed, and an optical pick-up 140 including a head 120 performs tracking and focusing control operations, to thereby output digital information stored on the disk 100 as an analog RF signal. This signal is shaped into a pulse waveform, and this data stream ESM and EFM are transmitted to a digital phase locked loop (PLL) 300 and a system decoder 200. The digital PLL 300 which includes a phase comparing circuit, a voltage controlled oscillator and a frequency demultiplier generates a first clock phase locked with a signal reproduced from the optical disk 100, thereby generating a clock PLCK capable of reading the ESM data in the system decoder 200. A disk driving controller 400 controls the constant linear velocity of disk rotation, and operations relative to the disk 100, with regard to frequency servo and phase servo in response to frame sync signals $Sf_1$ and $Sf_2$ provided from a sync detector (not shown) of the system decoder 200. The system clock generator 900 generates the clocks needed by the system decoder 200.

A memory 280 belongs to a memory of four megabyte dynamic RAM which is provided for error correction, variable bit rate and data buffering. The system decoder 200 demodulates data read from the disk 100 into a data state the same as before it is recorded in the disk 100. This demodulated data is stored in the memory 280, and then read from it again in a block unit. The data read is error-corrected in the system decoder 200, and stored in the memory 280 again. The system decoder 200 descrambles data read from the memory, and then stores the descrambled data in the memory 280. This data is read from the memory 280, and transmitted through an audio/video decoder interface 121 (see FIG. 2) to the audio/video decoder 600.

A microcomputer 500 controls the whole operation of the optical disk playback system. The microcomputer 500 generates a transmission control signal when it receives a data transmission start signal from the audio/video decoder 600. The video and audio data demodulated by the audio/video decoder 600 is transmitted to an NTSC (or PAL) encoder 700 and a D/A converter 800, and is output through a monitor 960 and a speaker 970, respectively. A ROM decoder 950, generally included in a host such as a personal computer, converts data into a data state suitable for computer processing.

Figure 2:
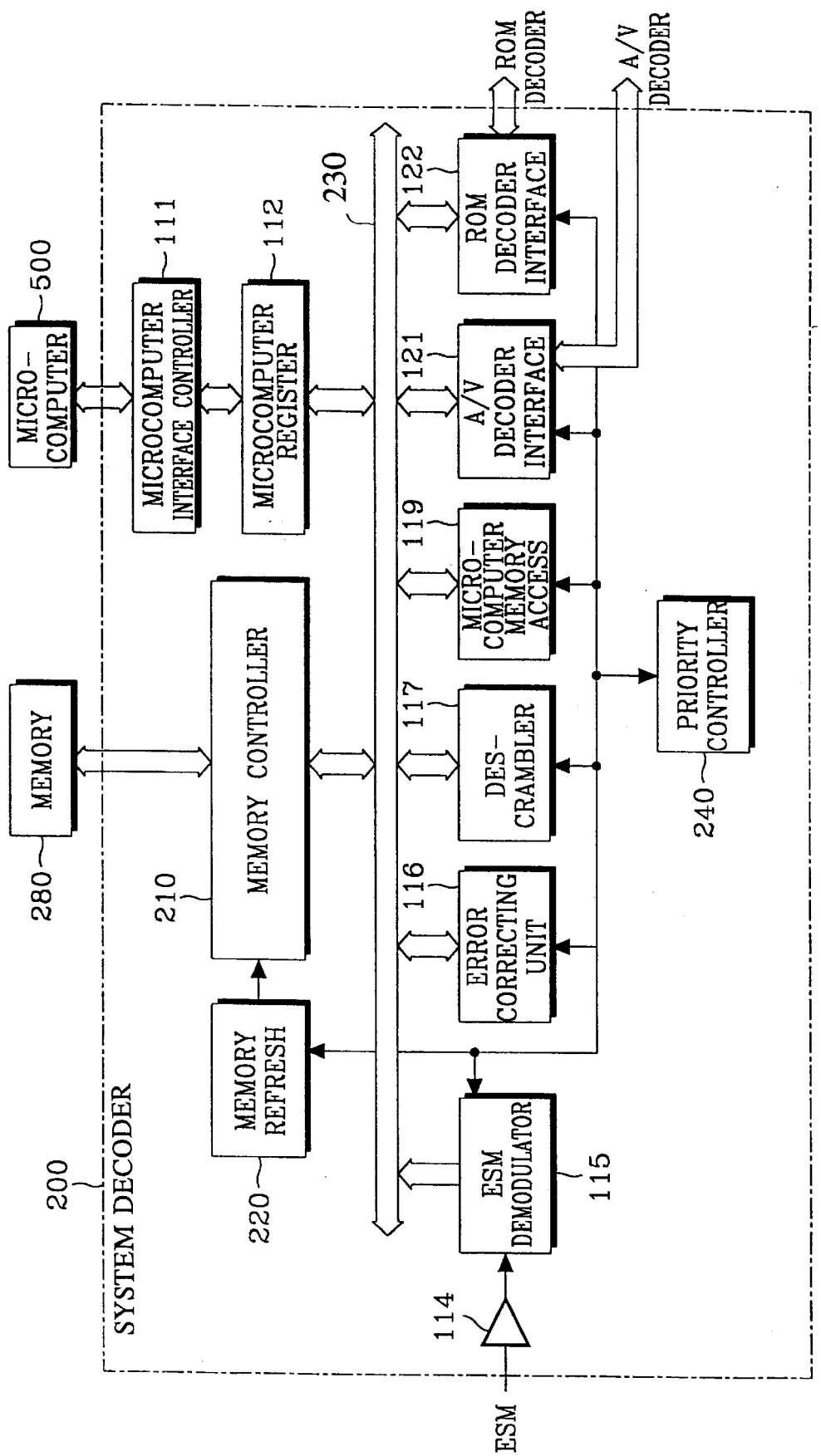
FIG. 2 is a block diagram showing a configuration of a system decoder of the disk player of FIG. 1.

FIG. 2 is a block diagram showing a configuration of the system decoder 200 of the disk player of FIG. 1. Referring to FIG. 2, a microcomputer interface controller 111 interfaces the microcomputer 500 to the system decoder 200. The microcomputer 500 controls the whole operation of the digital video disk player and the system decoder 200. When the digital video disk 100 is played back, the disk motor 160 starts to rotate at a predetermined linear velocity, and disk information is converted into an analog RF signal at the optical pick-up 140 having the head 120. This analog RF signal is shaped into a pulse waveform, and ESM data of the data stream including the pulse waveforms is amplified by an amplifier 114, and then transmitted to an ESM demodulator 115.

The ESM demodulator 115 demodulates the ESM data in a symbol unit including bits. That is, the ESM demodulator 115 supplies the ESM data to a 32-bit shift register (not shown), selects lower-order (or upper-order) 16 bits from the 32 bits output of the shift register, which transmits them to the ESM demodulator 115. The ESM demodulator 115 converts the 16-bit data into 8-bit data forming one symbol. This is because that data is recorded on the digital video disk 100 in eight to sixteen modulation. An error correcting unit 116 performs error correction for a predetermined block including data read from the disk 100, in vertical and horizontal directions.

The memory 280 stores ID data and main data output from the ESM demodulator 115 through a data bus 230 and the memory controller 210 in a predetermined block unit. The ID data refers to a physical address of the disk 100 and the main data refers to compressed data including an error correction code, that is, audio or video data to be finally reproduced. The memory controller 210 under the control of the microcomputer 500 assigns appropriate addresses to the memory 280, and provides the demodulated data to the memory 280, to thereby form an error correction block. The error correction block includes data of sixteen sectors of the memory 280. The memory 280 buffers data while the error correction is carried out in vertical and horizontal directions, and stores the corrected data. A descrambler 117 receives only corrected data corresponding to the main data from the corrected data stored in the memory 280, and compensates for time delay due to descrambling, to thereby recover the main data as the original data. The main data of one sector is two kilobytes.

A microcomputer memory access 119 makes the microcomputer 500 access the memory 280. An audio/video decoder interface 121 interfaces the system decoder 200 to the audio/video decoder 600. For example, the descrambled data stored in the memory 280 is sent to the audio/video decoder 600 in response to a data transmission request signal from the audio/video decoder 600. A ROM decoder interface 122 interfaces the ROM decoder 950 of the host to the system decoder 200. That is, the memory 280 where the descrambled data is stored transmits data to the ROM decoder 950 through the ROM decoder interface 122 in response to the data transmission request of the ROM decoder 950. The audio/video decoder interface 121 and the ROM decoder interface 122 transmit the descrambled data to the audio/video decoder 600 or to the ROM decoder 950 according to the kind of disk. In case of a digital video disk, data is transmitted to the audio/video decoder 600 in accordance with a user's intention, for example, watching movies. In case of a DVD-ROM, data is transmitted to the ROM decoder 950 for searching of information.

A memory refresh 220 prevents the data stored in the memory 280 from being erased using the memory controller 210. A priority controller 240 receives a request signal REQ for memory access, which is generated from the ESM demodulator 115, the error correcting unit 116, the descrambler 117, the microcomputer memory access 119, the audio/video decoder interface 121, the ROM decoder interface 122 and the memory refresh 220, and outputs an acknowledge signal ACK to the corresponding elements according to a priority. The priority controller 240 outputs the acknowledge signal ACK, and simultaneously outputs an access-request signal ACC-REQ to the memory controller 210.

The memory controller 210 under the control of the microcomputer 500 generates control signals for memory access, and forms a path between the data bus 230 and elements which request access. That is, the memory controller 210 stores the data read from the digital video disk 100 into the memory 280, reads the stored data in a predetermined block unit, provides it to the error correcting unit 116, and stores the data corrected at the error correction unit 116 into a predetermined region of the memory 280 again. Furthermore, when the data is descrambled or deinterleaved, the memory controller 210 stores data recovered into the memory 280, or reads data previously stored in the memory 280. The memory controller 210 where the access-request signal is applied reads memory addresses corresponding to read/write signals supplied from the elements thereto, to thereby provide access. Each of the elements outputs the read/write signal and access address of the memory 280. The access address is generated from an address counter included in each element, and sent to the memory controller 210.

The microcomputer register 112 receives data from the microcomputer 500, stores signals controlling the elements of the system decoder 200, and temporarily stores state information generated from the elements. The microcomputer 500 reads this state information. A microcomputer interface controller 111 interfaces with the microcomputer 500 so that the microcomputer reads and writes data in the microcomputer register 112 and the memory 280. The elements of the system decoder 200 have the one memory 280 in common, to perform the decoding process. The elements to which memory access is permitted by the priority controller 240 carry out the memory access. The audio/video decoder interface 121 transmits the descrambled data of the memory 280 in response to the data transmission request signal applied from the audio/video decoder 600.

Figure 3:
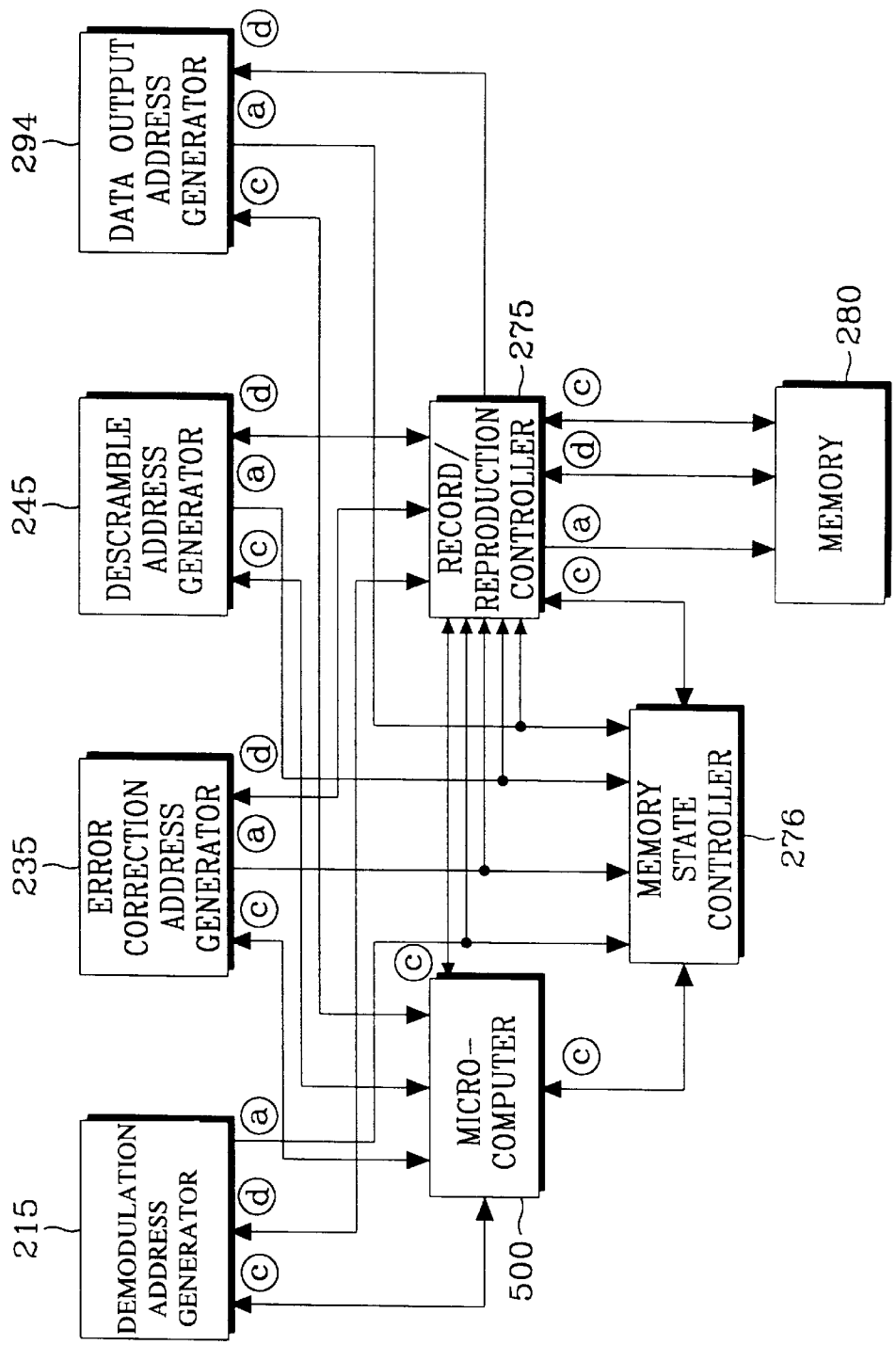
FIG. 3 is a block diagram showing a configuration of a portion relative to the memory control in the system decoder of FIG. 2.

FIG. 3 is a block diagram showing a configuration of the memory controller 210 in the system decoder 200 of FIG. 2 in relation to the memory 280 and the microcomputer 500. The memory controller 210 includes the demodulation address generator 215, error correction address generator 235, descramble address generator 245, data output address generator 294, record/reproduction controller 275 and memory state controller 276. In the figure, reference symbol (a) indicates an address bus, (c) indicates a control bus, and (d) indicates a data bus. Referring to FIG. 3, the memory 280 is used for error correction and data buffering. A unit number as an address is assigned to the memory 280 in a sector unit (two Kbytes). One unit is 2048 bytes. The demodulation address generator 215 counts clock latching data demodulated, and generates addresses.

The ESM demodulator 115 demodulates the data stream ESM sent thereto in a symbol unit including a predetermined number of bits. That is, the ESM demodulator 115 converts the data stream ESM into two 8-bit data each of which forms a symbol. This is because that data is eight-to-sixteen modulated when it is recorded in the disk 100. The error correcting unit 116 carries out error correction for a predetermined error correction block including data read from the digital video disk in horizontal and vertical directions. In this embodiment, the horizontal and vertical directions are (182, 172, 11) and (208, 192, 17), respectively. That is, the lengths of code words are 182 and 208, main data except for the parity bit is 172 and 192, and code word intervals are 11 and 17. For this error correction, the memory 280 collects and stores the ID data and main data output from the ESM demodulator 115 in a predetermined block unit, to thereby form the error correction block. The error correction block includes data of sixteen sectors. The memory 280 also buffers the data while the error correction in horizontal and vertical directions are performed, and stores corrected data.

The error correction address generator 235 generates an address for reading data to be error-corrected from the memory 280. Since the error-corrected main data stored in the memory 280 is scrambled before it is recorded in the disk 100, the descrambler 117 receives the main data read from the memory 280, and descrambles it, to thereby recover it as the original data. The main data is two Kbytes. The descramble address generator 245 generates an address for storing the descrambled data into the memory 280. The record/reproduction controller 275 performs control operations required for memory access to record or reproduce data. For this function, the memory state controller 275 generates an RAS signal, a CAS signal, an input enable signal and an output enable signal.

A memory state controller 276 judges a memory state of overflow, underflow and empty, with reference to address generation states of the address generators, and a predetermined critical value set into the microcomputer 500 or the controller 276, to command the record/reproduction controller 275 not to record data any more, or to generate a signal representing a memory state. A data output address generator 294 generates an address for reading data to be transmitted from the memory 280 when the data transmission request signal is sent thereto from the audio/video decoder or the ROM decoder 600 and 950. The microcomputer 500 detects if the data transmission request signal is sent to the data output address generator 294, and generates a transmission control signal to the data output address generator 294 and the record/reproduction controller 275.

Figures 4A, 4B, 4C, 4D, 4E, 4F, 4G:
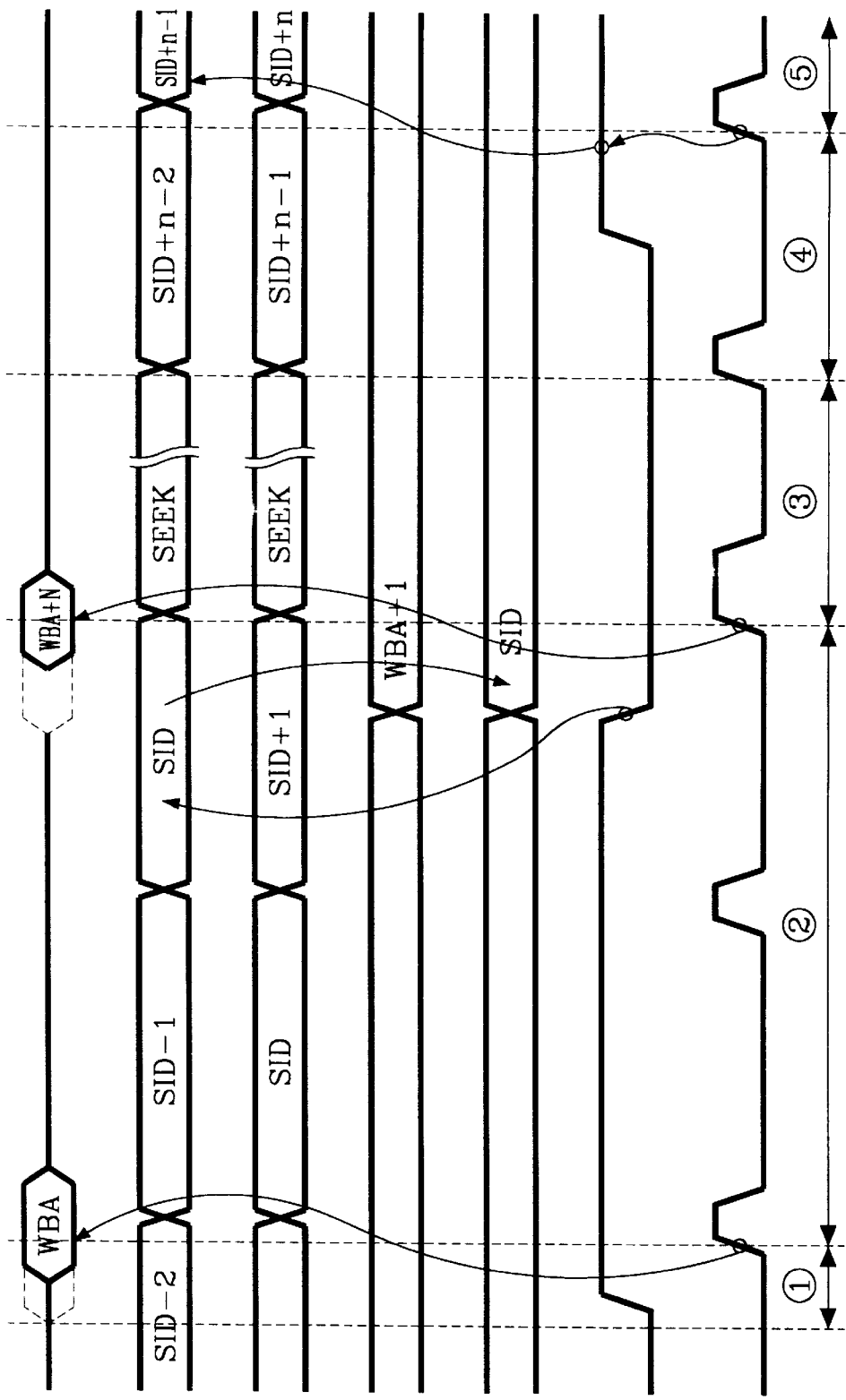
FIGS. 4A through 4G are timing diagrams of signals for storing demodulation data according to the embodiment of the present invention.

FIGS. 4A through 4G are timing diagrams of signals for storing demodulation data according to the embodiment of the present invention. Therein, FIG. 4A is a recording start address signal sent from the microcomputer 500 to the demodulation address generator 215. This is the address in the memory 280 of the microcomputer 500. FIG. 4B is a seek ID address signal which indicates a location of the disk 100, where ID data is stored. This signal is generated by the disk driving controller 400. The seek ID address signal informs the microcomputer 500 that data of a predetermined ID is being sought. FIG. 4C is an ID data signal actually stored on the disk 100. FIG. 4D is an information signal transmitted from the demodulation address generator 215 to the microcomputer 500, and is a recording completion memory address signal indicating an address in the memory 280 where data is recorded so far. For example, if information representing data up to the second address is recorded, the next recording can be carried out from the third address. FIG. 4E is a signal showing seek ID address corresponding to sectors of memory 280 where data is stored so far and is transmitted from the demodulation address generator 215 to the microcomputer 500. FIG. 4F is a recording command signal transmitted from the microcomputer 500 to the memory controller 270, and FIG. 4G is an interrupt signal generated from the record/reproduction controller 275 of the disk driving controller 400 and transmitted to the microcomputer 500. In this interrupt signal, a pulse is generated at every one sector, to input corresponding data.

For a section (1), the recording command signal is generated, to start storing data demodulated from the next interrupt signal. Here, the microcomputer 500 enables the recording command signal when it detects that the ID (SID-2) of a sector, two clocks ahead of ID the (SID) of a sector where data recording is currently required, is read. The two clocks result from the interval between the time where a predetermined one sector is read to the time where ESM demodulation is completed. For a section (2), data is stored while the seek ID address and recording start address are automatically increased. The recording command signal is converted into a logic "low" state to stop storing the data. Here, the recording register of the microcomputer 500 stores the next recording completion memory address WBA+1 and next seek ID address SID+1.

A section (3) indicates a seek section. For a section (4), when it is required to perform the storing again, the microcomputer 500 converts the recording command signal into a logic "high" state if the microcomputer detects seek ID address SID-2 of a sector, which is two clocks ahead of the seek ID address SID of a sector where data storing is required. When continuous data storage is required, the value of a memory recording completion address+1 is loaded in a recording start address register. When discontinuous data storage is required, the value of memory recording completion address+N is loaded in the recording start address register. Here, if the recording start address signal is converted into a logic "high" state, it is possible to begin to store the data in response to the next interrupt signal. Section (5) follows section (4).

FIGS. 5A through 5F are timing diagrams of signals for correcting errors according to the embodiment of the present invention. Herein, FIG. 5A is an error correction start address output signal sent from the microcomputer 500 to the error correction address generator 235, and is the address in the memory 280 of the microcomputer 500. FIG. 5B is an interrupt signal generated when the disk driving controller 400 reads digital video data. In this interrupt signal, a pulse is generated at every sector to input corresponding data. FIG. 5C is an error correction completion memory address signal transmitted from the error correction address generator 235 to the microcomputer 500. This address signal indicates an address in the memory, containing data where error correction is completed so far. For example, if information is stored representing that error correction is performed up to the third address, the next error correction starts from the next address, the fourth address.

FIG. 5D is a signal showing ID data of a sector where error correction is currently being performed. This ID data signal is transmitted from the error correction address generator 235 to the microcomputer 500, to inform the microcomputer 500 that error correction is carried out at the error correcting unit 116. FIG. 5E is an error correction start signal output from the microcomputer 500, and FIG. 5F is an error correction completion address signal generated by the error correcting unit 116 and which informs the microcomputer 500 that error correction is completed at the error correcting unit 116. With this information, the microcomputer 500 judges which sector is error-corrected.

For a section (A), when the error correction start signal is generated, error correction starts from the next interrupt signal. For a section (B), data error correction is performed while the error correction start address is automatically increased. For a section (C), the error correction start signal is converted into a logic "low" state to stop error correction. Here, the error correction completion memory address and ID data are loaded. The error correction is not carried out for an error correction block where error correction being performed after the error correction is completed. For a section (D), the error correction start signal is converted into a logic "high" state to perform error correction again. For the purpose of correcting a previous block repeatedly, the error correction completion memory address signal is loaded in the error correction start address register. For continuous error correction, the value of REA+1 is loaded on the register. For discontinuous error correction, the value of REA+N (N is a multiple of 16) is loaded on the register. When the error correction start signal is converted into a logic "high" state, the error correction starts from the next interrupt signal.

FIGS. 6A through 6F are timing diagrams of signals for data transmission according to the embodiment of the present invention. In FIG. 6, FIG. 6A is a transmission start address signal sent from the microcomputer 500 to the data output address generator 294, and is the address in the memory 280 of the microcomputer 500. FIG. 6B is a signal representing ID data currently being transmitted, and is transmitted from the record/reproduction controller 275 to the microcomputer 500 to inform the microcomputer 500 that data transmission is carried out. FIG. 6C is a transmission completion memory address signal generated by the record/reproduction controller 276 and indicates an address in the memory 280 containing data transmitted so far when the data transmission is stopped. With this information, the microcomputer 500 can judge which sector's data is transmitted. For example, if information is stored representing that data is transmitted up to the fourth address, data can be transmitted from the next address in response to the next transmission. FIG. 6D is a transmission completion ID data signal output from the microcomputer 500 to the record/reproduction controller 275. In response to this signal, corresponding data is read from the memory 280, and transmitted to the audio decoder or video decoder of the audio/video decoder 600 or ROM decoder 950. FIG. 6E is a transmission enable signal output from microcomputer 500. FIG. 6F is an interrupt signal requesting data transmission from the audio decoder or the video decoder of the audio/video decoder 600 or the ROM decoder 950, to the microcomputer 500.

For a section (E), the transmission enable signal is generated as soon as the interrupt signal is generated. For a section (F), as the interrupt signal is generated, data is sequentially transmitted while the ID data and transmission start address are automatically increased. When discontinuous data transmission is required, the transmission enable signal is disabled, the unit number of a buffer containing data requiring retransmission is loaded, and then the transmission enable signal is converted to a logic "high" state. When discontinuous data transmission is required, the value of a transmission completion memory address+N is loaded in the transmission start register, using the transmission enable signal. For a section (G), the interrupt signal is generated. Data is output while an address assigned to the transmission start address register is automatically increased. According to the present invention, it is possible to divide one memory into multiple domains when a digital video disk is played back. Accordingly, one memory can be used as error correction and data buffering memories, and thus it requires one region controlling record and reproduction for each memory. Such an arrangement simplifies the configuration of the digital video disk player, and reduces its cost. Furthermore, a small-size disk player can be produced.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A device for controlling a multidomain memory of an optical disk player which performs demodulation, error correction and descrambling for information data reproduced from an optical disk, and transmits the data to an audio/video decoder or a read only memory (ROM) decoder, said device comprising:

said memory to read or write data demodulated, error-corrected or descrambled by said disk player;

a demodulation address generator to count a clock which latches said demodulated data and, in response, generating a first address signal;

an error correction address generator to generate a second address signal for reading said data to be error-corrected from said memory;

a descramble address generator to generate a third address signal for storing said descrambled data into said memory;

a record/reproduction controller to generate signals required for accessing said memory to record or reproduce the data;

a data output address generator to generate a fourth address signal for reading data to be transmitted from said memory in response to a data transmission request signal being received from said audio/video decoder or ROM decoder; and a memory state controller to judge whether a memory state of said memory is in an overflow, an underflow or empty state by comparing the first through third address signals generated from said demodulation, error correction, and descramble address generators, respectively, with a predetermined critical value, so as to command said record/reproduction controller to stop recording, or to generate a signal indicating the memory state.

2. A device as claimed in claim 1, wherein said memory is a dynamic RAM.

3. A device for controlling a multidomain memory of an optical medium player, wherein the optical medium player reads information data from an optical medium, said device comprising:

a demodulator to demodulate said information data as demodulated data and to store said demodulated data in said memory;

an error correcting unit to read said demodulated data from said memory, error-correct said read demodulated data, and store said error-corrected data in said memory;

a descrambler to read said error-corrected data from said memory, descramble said read error-corrected data, and store said descrambled data in said memory; and a memory controller to generate a first address signal for storing said demodulated data in said memory, a second address signal for reading said demodulated data from said memory to be error-corrected, and a third address signal for storing said descrambled data in said memory.

4. A device as claimed in claim 3, wherein said memory controller comprises:

a demodulation address controller to count a clock which latches said demodulated data and, in response, generating said first address signal;

an error correction address generator to generate said second address signal; and a descramble address generator to generate said third address signal.

5. A device as claimed in claim 4, further comprising:

a decoder to generate a transmission request signal to read said descrambled data from said memory and to decode said descrambled data read from said memory;

wherein said memory controller further comprises a data output address generator to generate a fourth address signal to read said descrambled data from said memory in response to said transmission request signal.

6. A device as claimed in claim 3, further comprising:

a decoder to generate a transmission request signal to read said descrambled data from said memory and to decode said descrambled data read from said memory;

wherein said memory controller further comprises a data output address generator to generate a fourth address signal to read said descrambled data from said memory in response to said transmission request signal.

7. A device as claimed in claim 4, further comprising:

a record/reproduction controller to generate signals required for said demodulator, error correcting unit and descrambler to access said memory; and a memory state controller to determine whether a memory state of said memory is in an overflow, underflow or empty state by comparing the respective one of said first through third address signal with a predetermined value, so as to command said record/reproduction controller to stop the access to said memory or to generate a signal indicating the memory state.

8. A device as claimed in claim 5, further comprising:

a record/reproduction controller to generate signals required for said demodulator, error correcting unit and descrambler to access said memory; and a memory state controller to determine whether a memory state of said memory is in an overflow, underflow or empty state by comparing the respective one of said first through third address signal with a predetermined value, so as to command said record/reproduction controller to stop the access to said memory or to generate a signal indicating the memory state.

9. A device as claimed in claim 4, further comprising a priority controller to determine a priority between said first through third address signals if at least two of said demodulator, error correcting unit and descrambler attempt to access said memory simultaneously.

10. A device as claimed in claim 8, further comprising a priority controller to determine a priority between said first through fourth address signals if at least two of said demodulator, error correcting unit, descrambler, and data output address generator attempt to access said memory simultaneously.

11. A device as claimed in claim 3, wherein:

said demodulator converts said information data into two 8-bit data, each forming a symbol; and said error correcting unit performs error-correction for a predetermined block of said demodulated data read from said memory in horizontal and vertical directions.

12. A device as claimed in claim 10, wherein:

said demodulator converts said information data into two 8-bit data, each forming a symbol; and said error correcting unit performs error-correction for a predetermined block of said demodulated data read from said memory in horizontal and vertical directions.

13. A device as claimed in claim 11, wherein said horizontal and vertical directions are (182, 172, 11) and (208, 192, 17), respectively.

14. An optical medium player, wherein the optical medium player reads information data from an optical medium, the optical medium player comprising:

a memory of a single type having a first domain for storing demodulated data, a second domain for storing error-corrected data, and a third domain for storing descrambled data; and a memory controller to generate a first address signal for storing said demodulated data in said first domain, a second address signal for reading said demodulated data from said first domain, and a third address signal for storing said descrambled data in said third domain.

15. An optical medium player as claimed in claim 14, wherein said memory controller generates a fourth address signal to store said error-corrected data in said second domain.

16. An optical medium player as claimed in claim 14, further comprising:

a demodulator to demodulate said information data as said demodulated data and to control said memory controller to store said demodulated data in said first domain;

an error correcting unit to control said memory controller to read said demodulated data from said first domain, error-correct said read demodulated data, and control said memory controller to store said error-corrected data in said second domain; and a descrambler to control said memory controller to read said error-corrected data from said second domain, descramble said read error-corrected data, and control said memory controller to store said descrambled data in said third domain.

* * * * *